(12) United States Patent
Huang et al.

(10) Patent No.: US 12,021,954 B2
(45) Date of Patent: Jun. 25, 2024

(54) METHOD AND DEVICE FOR SENDING AND RECEIVING DATA PACKET, AND DATA PACKET TRANSMISSION SYSTEM

(71) Applicant: ZTE Corporation, Shenzhen (CN)

(72) Inventors: Ying Huang, Shenzhen (CN); Lin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 680 days.

(21) Appl. No.: 17/254,416

(22) PCT Filed: Jun. 21, 2019

(86) PCT No.: PCT/CN2019/092322
§ 371 (c)(1),
(2) Date: Dec. 21, 2020

(87) PCT Pub. No.: WO2019/242747
PCT Pub. Date: Dec. 26, 2019

(65) Prior Publication Data
US 2021/0126991 A1  Apr. 29, 2021

(30) Foreign Application Priority Data
Jun. 21, 2018 (CN) .......................... 201810646139.1

(51) Int. Cl.
*H04W 40/02* (2009.01)
*H04L 5/00* (2006.01)
(Continued)

(52) U.S. Cl.
CPC ............ *H04L 69/22* (2013.01); *H04L 5/0053* (2013.01); *H04W 72/04* (2013.01); *H04W 76/11* (2018.02)

(58) Field of Classification Search
CPC ...... H04L 69/22; H04L 5/0053; H04W 72/04; H04W 76/11; H04W 76/12
See application file for complete search history.

(56) References Cited

U.S. PATENT DOCUMENTS 10,432,295 B2 * 10/2019 Majmundar .......... H04L 45/123
2017/0325250 A1 * 11/2017 Manolakos ........... H04W 72/12
(Continued)

FOREIGN PATENT DOCUMENTS

CN         107736004 A    2/2018
CN         107852363 A    3/2018
(Continued)

OTHER PUBLICATIONS

3GPP TSG-RAN WG3 Meeting#101, R3-184843 Title:Overview of flow control solution for architecure 1 and 2 (Year: 2018).*
(Continued)

*Primary Examiner* — Faruk Hamza
*Assistant Examiner* — Abusayeed M Haque
(74) *Attorney, Agent, or Firm* — CANTOR COLBURN LLP

(57) ABSTRACT

Provided is a method for sending a data packet, including: adding, by an Integrated Access and Backhaul Links (IAB) node, an adaptation layer packet header to a data packet, and sending, by the IAB node, the data packet to a next-hop IAB node, wherein the data packet is a control plane signaling or a user plane data packet; or acquiring, by the IAB node, bearer configuration information, determining, by the IAB node according to the bearer configuration information, a bearer for sending a data packet, and sending, by the IAB node, the data packet to a child IAB node, a parent IAB node or an IAB donor through the bearer. Also provided are a device for sending a data packet, a method and device for
(Continued)

Receiving a data packet sent by a designated IAB node, wherein the designated IAB node is a child IAB node, a parent IAB node, or an IAB donor — S902

Processing, by the IAB node, the data packet according to acquired bearer configuration information — S904 receiving a data packet, a data packet transmission system, a storage medium and an electronic device.

9 Claims, 5 Drawing Sheets

(51) Int. Cl.
    *H04L 69/22*     (2022.01)
    *H04W 72/04*     (2023.01)
    *H04W 76/11*     (2018.01)
    *H04W 76/12*     (2018.01)

(56) References Cited

U.S. PATENT DOCUMENTS

| | | | |
|---|---|---|---|
| 2018/0239787 A1* | 8/2018 | Viol | G06F 16/217 |
| 2019/0215055 A1* | 7/2019 | Majmundar | H04W 40/22 |
| 2019/0223002 A1* | 7/2019 | Novlan | H04W 72/20 |
| 2019/0356364 A1* | 11/2019 | Maamari | H04L 5/0062 |

FOREIGN PATENT DOCUMENTS

| | | |
|---|---|---|
| CN | 110035042 A | 7/2019 |
| WO | 2010107357 A1 | 9/2010 |
| WO | 2017034728 A1 | 3/2017 |
| WO | WO-2019245547 A1 * | 12/2019 |

OTHER PUBLICATIONS

3GPP TSG-RAN WG3 Meeting#103, R2-1811171 Title:[M203], Value Ranges of Parameters for Nr-to-LTE Cell Reselection (Year: 2018).*
International Search Report for corresponding application PCT/CN2019/092322 filed Jun. 21, 2019; Mail date Sep. 11, 2019.
European Search Report for corresponding application EP19822030; Dated Jul. 19, 2021.
Huawei Hisilicon, "Adaption layer based L2 relaying and light L2 relaying", 3GPP TSG-RAN WG2 #99bis, Sanya China Apr. 16-20, 2018.
ZTE, "Considerations on Adaption layer in IAB", 3GPP TSG RAN WG3 Meeting #100, Busan Korea, May 21-25, 2018.
Huawei, "CP protocol design for L2 relaying", 3GPP TSG-RAN WG3 #100, Busan Korea, May 21-25, 2018.
Huawei, IAB Node Access Procedure, 3GPP TSG RAN WG3 Meeting #100, Busan Korea, May 21-25, 2018.
OPPO, "Discussion on User Plane for IAB", 3GPP TSG RAN2 Meeting #102, Busan Korea, May 21-25, 2018.
Qualcomm Inc, "IAB NSA", 3GPP TSG RAN WG3 Meeting #100, Busan Korea, May 21-25, 2018.

* cited by examiner

AL: Adaptation Layer

METHOD AND DEVICE FOR SENDING AND RECEIVING DATA PACKET, AND DATA PACKET TRANSMISSION SYSTEM

This application claims priority to Chinese Patent Application No. 201810646139.1, filed before the China National Intellectual Property Administration (CNIPA) on 21 Jun. 2018, the disclosure of which is incorporated herein by reference in its entirety.

TECHNICAL FIELD

The present disclosure relates to the field of communications, and in particular to a method and device for sending and receiving a data packet, and a data packet transmission system.

BACKGROUND

Compared with Long Term Evolution (LTE), New Radio (NR) uses a larger available bandwidth, a Massive Multiple-Input Multiple-Output (massive MIMO) and a multi-beam, such that the researches and applications of integrated Access and Backhaul Links (IAB) become possible. By means of wireless backhaul links and relay links, dense NR cell networks can be deployed more flexibly without having to correspondingly increasing the deployment density of transmission networks. An access node that supports wireless access of User Equipment (UE) and backhauls a User Plane (UP) or Control Plane (CP) data packet wirelessly is referred to as an IAB node. An access node that provides a wireless backhauling function for an IAB node such that the UE is connected to a core network is referred as an IAB donor. The IAB node (which may also be referred to as a child IAB node, or an IAB child node) may be accessed to another IAB node (which may also be referred to as a parent IAB node, or an IAB parent node) or accessed to the IAB donor. The access nodes may transmit the UP or CP data packet between each other by a wireless backhaul link. The access link and the backhaul link may use the same bearer frequency or different bearer frequencies. In addition, the UP or CP data packet may be sent through a multi-hop relay backhaul link between the access node and the core network element. FIG. 1 is a schematic diagram of an IAB scenario in which a (Centralized Unit) CU/DU is not separately deployed according to the relevant art. As illustrated in FIG. 1, the uplink data packet of the UE may be sent to the IAB donor through two IAB nodes, and then sent to the 5th Generation (5G) Next Generation Core (NGC). On the other hand, it is an important technical feature in the NR to support the separate deployment of the CU/DU, i.e., the 5G gNB is composed of CU and DU logical functions. FIG. 2 is a schematic diagram of an IAB scenario in which a CU/DU is separately deployed according to the relevant art. As shown in FIG. 2, the IAB node may have DU-related functions and Mobile Terminal (MT)-related functions, which are respectively referred to as DU part and MT part, where the MT part has functions related to UE. In FIG. 2, the 5GC stands for the 5G Core, and the F1 and NG are interfaces. Besides, the CU may further be composed of CP (which may also be referred to as a CU-CP) and UP (which may also be referred to as a CU-UP) logical functions. Concerning the problem on how to relay control signaling based on the above IAB architecture so as to guarantee correct sending and receiving of the control signaling, no effective solution has been pushed forward in the related art till now.

SUMMARY

Embodiments of the present disclosure provide a method and device for sending and receiving a data packet, and a data packet transmission system, which may at least solve the problem that there is no solution in the related art on how to relay control signaling based on the above IAB architecture so as to guarantee correct sending and receiving of the control signaling.

According to an embodiment of the present disclosure, a method for sending a data packet is provided. The method includes the following operations. An Integrated Access and Backhaul Links (IAB) node adds an adaptation layer packet header to a data packet, and sends the data packet to a next-hop IAB node, wherein the data packet is a control plane signaling or a user plane data packet.

According to another embodiment of the present disclosure, a method for sending a data packet is provided. The method includes the following operations. An Integrated Access and Backhaul Links (IAB) node acquires bearer configuration information, and determines, according to the bearer configuration information, a bearer for sending a data packet. The IAB node sends the data packet to a child IAB node, a parent IAB node or an IAB donor through the bearer.

According to another embodiment of the present disclosure, a method for receiving a data packet is provided. The method includes the following operations. An Integrated Access and Backhaul Links (IAB) node receives a data packet sent by a designated IAB node, wherein the designated IAB node is a child IAB node or a parent IAB node or an IAB donor. The IAB node processes the data packet according to acquired bearer configuration information.

According to another embodiment of the present disclosure, provided is a device for sending a data packet, which is located in an Integrated Access and Backhaul Links (IAB) node and includes a setting module and a sending module. The setting module is configured to add an adaptation layer packet header to a data packet. The sending module is configured to send the data packet to a next-hop IAB node, wherein the data packet is a control plane signaling or a user plane data packet.

According to another embodiment of the present disclosure, provided is a device for sending a data packet, which is located in an Integrated Access and Backhaul Links (IAB) node and includes an acquiring module and a sending module. The acquiring module is configured to acquire bearer configuration information, and determine, according to the bearer configuration information, a bearer for sending a data packet. The sending module is configured to send the data packets to a child IAB node, a parent IAB node or an IAB donor through the bearer.

According to another embodiment of the present disclosure, provided is a device for receiving a data packet, which is located in an Integrated Access and Backhaul Links (IAB) node and includes a receiving module and a processing module. The receiving module is configured to receive a data packet sent by a designated IAB node, wherein the designated IAB node is a child IAB node or a parent IAB node or an IAB donor. The processing module is configured to process the data packet according to acquired bearer configuration information.

According to another embodiment of the present disclosure, a data packet transmission system is provided, including: a first Integrated Access and Backhaul Links (IAB) node and a second IAB node. The first IAB node is configured to add an adaptation layer packet header to a data packet and send the data packet to the second IAB node. The second IAB node is configured to receive the data packet containing the adaptation layer packet header, wherein the data packet is a control plane signaling or a user plane data packet.

According to another embodiment of the present disclosure, a data packet transmission system is provided. The system includes a first Integrated Access and Backhaul Links (IAB) node and a second IAB node. The first IAB node is configured to acquire bearer configuration information, determine, according to the bearer configuration information, a bearer for sending a data packet, and send the data packet to the second IAB node through the bearer. The second IAB node is configured to receive the data packet sent by the first IAB node, acquire the bearer configuration information, and process the data packet according to the bearer configuration information, wherein the second IAB node is a child IAB node or a parent IAB node of the first IAB node.

According to another embodiment of the present disclosure, a data packet transmission system is provided, including: an Integrated Access and Backhaul Links (IAB) node and an IAB donor. The IAB node is configured to acquire bearer configuration information, determine, according to the bearer configuration information, a bearer for sending a data packet, and send the data packet to the IAB donor through the bearer. The IAB donor is configured to receive the data packet sent by the IAB node.

According to yet another embodiment of the present disclosure, a storage medium is also provided, wherein the storage medium stores a computer program, and the computer program is configured to execute, when running, the method according to any one of the above embodiments.

According to another embodiment of the present disclosure, provided is an electronic device, including a memory and a processor, wherein the memory stores a computer program, and the processor is configured to run the computer program to execute the method of any one of the above embodiments.

BRIEF DESCRIPTION OF THE DRAWINGS

Drawings, provided for further understanding of the present disclosure and forming a part of the description, are used to explain the present disclosure in combination with exemplary embodiments of the present disclosure rather than to limit the present disclosure. In the drawings.

DETAILED DESCRIPTION OF THE EMBODIMENTS

Hereinafter, the present disclosure will be described in detail with reference to the accompanying drawings and embodiments. It is important to note that the embodiments of the present disclosure and the characteristics in the embodiments can be combined if no conflict is caused.

It should be noted that, terms such as "first" and "second" in the description, claims, and accompanying drawings of the present disclosure are used to distinguish similar objects, but are not necessarily used to describe a specific sequence or order.

Embodiment 1

Figure 3:
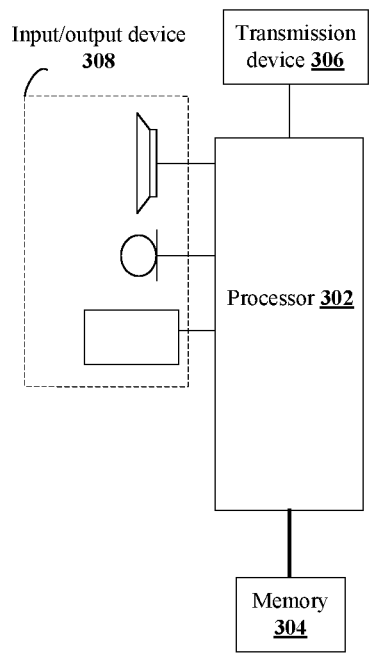
FIG. 3 is a hardware structural block diagram of a mobile terminal for sending a data packet according to an embodiment of the present disclosure.

The method embodiment provided in the Embodiment 1 of the present application may be implemented in a mobile terminal, a computer terminal, or a similar computing device. By taking running on a mobile terminal as an example, FIG. 3 is a hardware structural block diagram of a mobile terminal for sending a data packet according to an embodiment of the present disclosure. As shown in FIG. 3, the mobile terminal 30 may include one or more processors 302 (only one processor 302 is shown in FIG. 3) (the one or more processors 302 may include, but are not limited to, a microprocessor (e.g., MCU) or a processing device such as a programmable logic device (e.g., FPGA)) and a memory 304 for storing data. In exemplary implementations of the present embodiment, the mobile terminal may further include a transmission device 306 for achieving a communication function and an input/output device 308. A person of ordinary skill in the art may understand that the structure shown in FIG. 3 is merely an example, which does not limit the structure of the foregoing mobile terminal. For example, the mobile terminal 30 may further include more or fewer components than that shown in FIG. 3, or may have a different configuration from that shown in FIG. 3.

The memory 304 may be configured to store a computer program, for example, a software program and module of application software, such as a computer program corresponding to the method for sending a data packet in the embodiment of the present disclosure. The processor 302 runs the computer program stored in the memory 304, so as to execute various function applications and data processing, that is, to implement the foregoing method. The memory 304 may include high-speed random access memory, and may also include non-volatile memory, such as one or more magnetic storage devices, flash memory, or other non-volatile solid-state memory. In some examples, the memory 304 may further include memory remotely located with respect to the processor 302, which may be connected to the mobile terminal 30 over a network. Examples of such networks include, but are not limited to, the Internet, intranets, local area networks, mobile communication networks, and combinations thereof.

The transmission device 306 is configured to receive or send data through a network. Specific examples of the network described above may include a wireless network provided by a communication provider of the mobile terminal 30. In one example, the transmission device 306 may include a Network Interface Controller (NIC) that may be coupled to other network devices through a base station to communicate with the Internet. In one example, the transmission device 306 may be a radio frequency (RF) module configured to wirelessly communicate with the Internet.

Figure 4:
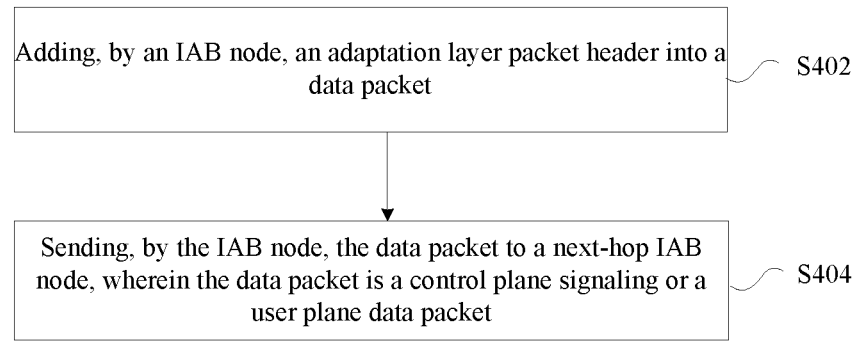
FIG. 4 is a flowchart of a method for sending a data packet according to an embodiment of the present disclosure.

The embodiment provides a method for sending a data packet running on a mobile terminal. FIG. 4 is a flowchart of a method for sending a data packet according to an embodiment of the present disclosure. As shown in FIG. 4, the flow includes the following operations.

At S402, an IAB node adds an adaptation layer packet header into a data packet.

At S404, the IAB node sends the data packet to a next-hop IAB node, wherein the data packet is a control plane signaling or a user plane data packet.

In exemplary implementations of the present embodiment, the IAB node may set the added adaptation layer packet header by acquiring identifier information of the IAB node. It should be noted that, when the IAB node sets the added adaptation layer packet header by acquiring the identifier information of the IAB node, the data packet may be a control plane signaling or a user plane data packet generated by the current IAB node.

In exemplary implementations of the present embodiment, the IAB node may acquire the identifier information in the following manner. The IAB node may acquire the identifier information from a CU through a Radio Resource Control (RRC) message, or the IAB node may acquire the identifier information through an F1 message, or the IAB node may acquire the identifier information from a parent IAB node through a Media Access Control Control Element (MAC CE, which is a MAC edge device).

In exemplary implementations of the present embodiment, before the IAB node adds the adaptation layer packet header to the data packet, the IAB node acquires IAB node indication information from a CU through an F1 message, wherein the IAB node indication information is used to indicate that a previous-hop node of the IAB node is an IAB node.

In exemplary implementations of the present embodiment, when the IAB node does not acquire its own IAB node, the adaptation layer packet header added by the IAB node includes identifier information of a source IAB node, wherein the source IAB node is a previous-hop IAB node of the IAB node. It should be noted that, when the IAB node does not acquire its own IAB node, the data packet is from control plane signaling or user plane data packet generated by another IAB node or UE.

In exemplary implementations of the present embodiment, the adaptation layer packet header further includes at least the following information: format indication information; indication information indicating whether an information field for designated information exists; relay indication information; protocol type indication information; indication information indicating whether protocol layer processing needs to be executed or has been executed; indication information indicating a UE identifier type; indication information indicating that a UE identifier and an MT identifier are distinguished; indication information indicating a generation source of the data packet.

It should be noted that other necessary information (such as UE identifier (UE ID) information, MT identifier information of the IAB node, target node information, a bearer identifier, a logical channel identifier, routing path information, Quality of Service (QoS) information, General Packet Radio Service Tunneling Protocol (GTP) tunnel information, F1 Access Point Identity (F1AP ID) information, control plane indication information, and user plane indication information) also belongs to the scope of protection of the present embodiment.

In exemplary implementations of the present embodiment, the QoS information includes but is not limited to QoS Class Identifier (QCI), Quality of Service flow Identifier (QFI), 5th-Generation QoS Indicator (5QI), Differentiated Services Code Point (DSCP), Type of Service (TOS) information.

In exemplary implementations of the present embodiment, the format indication information includes long format information or short format information. The short format information indicates that the adaptation layer packet header does not include information such as a UE identifier, a bearer identifier and target node information.

In exemplary implementations of the present embodiment, the indication information indicating whether an information field for designated information exists at least includes one of the following: indication information indicating whether a source IAB node identifier information field exists; indication information indicating whether a target information field exists; indication information indicating whether a UE ID field exists; indication information indicating whether a bearer identifier field exists; indication information indicating whether a UE bearer field exists; and indication information indicating whether a QoS information field exists.

In exemplary implementations of the present embodiment, the protocol type indication information includes but is not limited to: RRC indication information and F1 Application Protocol (F1AP) indication information.

In exemplary implementations of the present embodiment, the indication information indicating whether the protocol layer processing needs to be executed or has been executed at least includes one of the following: indication information indicating whether F1AP protocol layer processing needs to be executed or has been executed; indication information indicating whether a GTP User Plane (GTP-U) protocol layer processing needs to be executed or has been executed; and indication information indicating whether Packet Data Convergence Protocol (PDCP) protocol layer processing needs to be executed or has been executed.

In exemplary implementations of the present embodiment, the indication information indicating the generation source of the data packet at least includes one of the following: indication information indicating that the data packet is generated by a UE; and indication information indicating that the data packet is generated by the IAB node.

In exemplary implementations of the present embodiment, if the relay indication information indicates that the packet is a forwarded data packet, the IAB node performs routing forwarding according to information in the received adaptation layer packet header; if the relay indication information indicates that the packet is not a forwarded data packet, the IAB node needs to re-fill the content of the adaptation layer packet header, and modify the indication field for the relay indication information.

In exemplary implementations of the present embodiment, for the data packet generated by the IAB node, information may be filled in the adaptation layer packet header in the following manner.

1. The IAB node fills in target information and UE ID information. It may be necessary to further regulate to send the UE identifier to the IAB node.

2. The parent IAB node fills in target information and UE ID information. In the inter-CU scenario, the target information filled in by the parent IAB node may be incorrect.

3. The IAB node fills in target information, and the parent IAB node fills in UE ID information.

In exemplary implementations of the present embodiment, the identifier information of the current IAB node or the identifier information of the source IAB node includes one of the following: a first ID for identifying a MT part of the IAB node, and a second ID for identifying a DU part, a CU part or a base station part of the IAB donor or the IAB node.

In exemplary implementations of the present embodiment, the first identifier includes at least one of: a Cell Radio Network Temporary Identifier (C-RNTI) and an identifier of a node or cell allocating the C-RNTI, an F1AP ID, an X2 Access Point Identity (X2AP ID), a General Packet Radio Service Tunneling Protocol Tunnel End point Identifier (GTP TEID), a DU identifier, a cell identifier, a Physical-layer Cell Identity (PCI), and a third identifier.

In exemplary implementations of the present embodiment, the C-RNTI identifier at least includes one of the following identifiers: C-RNTI+cell identifier, C-RNTI+base station identifier, C-RNTI+DU identifier.

In exemplary implementations of the present embodiment, the second identifier at least includes one of the following: a DU identifier, a CU identifier, a base station identifier, a cell identifier, a Physical-layer Cell Identity (PCI), an Internet Protocol (IP) address and a third identifier.

In exemplary implementations of the present embodiment, the third identifier is an identifier allocated by a CU, or the third identifier is an identifier allocated by a CU-CP, or the third identifier is an identifier allocated by a CU-UP, or the third identifier is an identifier allocated by a parent IAB node.

In exemplary implementations of the present embodiment, in a case where the data packet is the control plane signaling, the control plane signaling contains identifier information of a source node or identifier information of a target node. It should be noted that the identifier information of the source node may be identifier information of a previous-hop IAB node or a source IAB node, and the identifier information of the target node may be identifier information of an IAB node connected behind the current IAB node or identifier information of an IAB donor.

In exemplary implementations of the present embodiment, a method for the IAB node to judge whether to perform corresponding protocol layer processing (which may include F1AP or RRC or PDCP or GTP-U) is provided. The method in the exemplary implementations of the present embodiment is applicable to all IAB protocol stack architectures.

Method 1:

The IAB node determines whether to perform corresponding protocol layer processing according to whether the data packet is received from the UE or the IAB node. If the data packet is received from the UE, F1AP or GTP-U encapsulation is required. In this method, the IAB node needs to be able to distinguish packets received from the UE and from the IAB node, and this can be achieved by the following method.

The IAB node sends IAB node indication information and the identifier information of the IAB node to the CU through an RRC message. The CU sends the IAB node indication information to the parent IAB node of the IAB node through an F1 signaling.

The IAB node uses a specific random access resource (e.g., preamble, time-frequency domain resource, etc.) dedicated to the IAB node in the random access process. In exemplary implementations of the present embodiment, the IAB node may acquire the specific random access resource dedicated to the IAB node through a system message.

The IAB node may send the IAB node indication information to the parent IAB node through the MAC CE.

Method 2: for a data packet received from an IAB node, the IAB node may include indication information in the adaptation layer packet header. For the content of the indication information included in the adaptation layer packet header, reference may be made to the description in the Embodiment 1.

Method 3: for a data packet received from an IAB node, whether to execute corresponding protocol layer processing can be judged based on a bearer to which the received data packet belongs. The IAB node may acquire bearer configuration information from the CU through an RRC message or an F1 message, and determine whether to perform the corresponding protocol layer processing according to the bearer to which the received data packet belongs Specifically, the following scenarios are further provided, so as to facilitate the understanding of the technical solution of the present embodiment.

Figure 5:
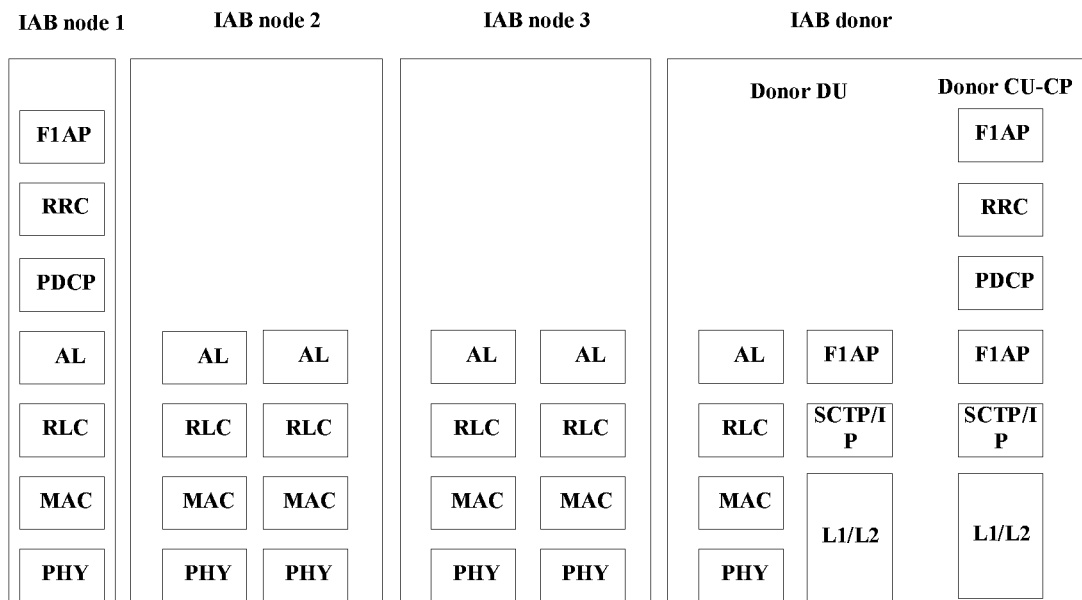
FIG. 5 is a schematic diagram of an IAB deployment scenario according to an embodiment of the present disclosure.

In the case where the control plane information (RRC message and F1AP message) of the IAB node is forwarded through the control plane Signaling Radio Bearer (SRB), the IAB node performs the adaptation layer processing for all the data packets. FIG. 5 is a schematic diagram of an IAB deployment scenario according to an embodiment of the present disclosure. The protocol stack between the IAB node and the IAB donor is shown in FIG. 5. In FIG. 5, the adaptation layer is located above the Radio Link Control (RLC) layer of the IAB node and the IAB donor DU. It should be noted that the adaptation layer may also be located between the RLC layer and the Media Access Control (MAC) layer, or the adaptation layer functions may be located in the RLC layer or the MAC layer. There may also be an adaptation layer on the interface between the donor DU and the CU-CP, that is, the donor DU and the CU-CP perform corresponding adaptation layer processing. Unless otherwise specified, the donor CU in the present embodiment refers to a donor CU-CP. For the case where the separation of the CP and the UP of the CU is not considered, the donor CU-CP in the present embodiment is replaced by the donor CU. It should be noted that a Stream Control Transmission Protocol (SCTP)/IP layer may also exist under the F1AP protocol layer. Note that there may be no RRC protocol layer between the F1AP protocol layer and the PDCP protocol layer. In addition, the adaptation layer in FIG. 5 terminates at the donor DU. The method in the present embodiment is also applicable to a case where the adaptation layer terminates at the donor CU/CU-CP. It should be noted that the method in the present embodiment is not limited to the architecture shown in FIG. 5. In FIG. 5, L1 denotes a physical layer in the protocol stack model, and L2 denotes a link layer in the protocol stack model.

Scenario 1

For uplink forwarding of a data packet (forwarding in the direction from the IAB node 1 to the IAB donor in FIG. 5), the following operations may be included.

At operation 1, after the DU part of the IAB node 1 generates an F1 message, optionally, the IAB node 1 executes RRC layer processing; or the MT part of the IAB node 1 generates an RRC message. The IAB node 1 performs PDCP layer processing on the RRC message or F1 message. In exemplary implementations of the present embodiment, the RRC message or the F1 message generated by the IAB node 1 include the identifier information of the source node and/or the identifier information of the target node. In exemplary implementations of the present embodiment, if the IAB node 1 generates control plane signaling of other interfaces (for example, X2, Xn, S1, NG interface signaling), the control plane signaling includes the identifier information of the source node and/or the identifier information of the target node. In exemplary implementations of the present embodiment, a PDCP Protocol Data Unit (PDU) of the control plane signaling data packet contains protocol type indication information indicating a protocol type borne by the packet. The protocol type includes one of the following: RRC, F1AP, X2AP, XnAP, S1AP and NGAP.

After that, the IAB node 1 performs adaptation layer processing, and adds an adaptation layer packet header. The adaptation layer packet header may include one or a combination of the following information:

identifier information of the source IAB node;
MT identifier information of the IAB node;
long format indication information;
short format indication information;
indication information indicating whether a target information field exists;
indication information indicating whether a UE ID field exists;
indication information indicating whether a bearer identifier field exists;
indication information indicating whether a UE bearer field exists;
indication information indicating whether a QoS information field exists;
relay indication information;
protocol type indication information, including but not limited to RRC, F1AP;
indication information indicating whether F1AP protocol layer processing needs to be executed;
indication information indicating whether GTP-U protocol layer processing needs to be executed;
indication information indicating whether PDCP protocol layer processing needs to be executed;
indication information indicating a UE identifier type;
indication information indicating whether a contained identifier is a UE identifier or an MT identifier;
indication information indicating whether a data packet is generated by a UE or is generated by an IAB node;
UE identifier information (UE ID information); target node information; a bearer identifier; a logical channel identifier; routing path information; Quality of Service (QoS) information; GTP tunnel information; F1AP ID information; control plane indication information; user plane indication information.

The node identifier information may be a first identifier for identifying the MT part of the IAB node, and/or a second identifier for identifying the DU or CU or base station part of the IAB donor or the IAB node. The first identifier includes, but is not limited to, at least one of: C-RNTI, C-RNTI+cell identifier, C-RNTI+base station identifier, C-RNTI+DU identifier, F1AP ID, X2AP ID, GTP TEID. The above-mentioned cell identifier, base station identifier and DU identifier are identifiers of cells or base stations or DUs allocated to the C-RNTI. The second identifier includes, but is not limited to, at least one of: a DU identifier, a CU identifier, a base station identifier, a cell identifier, a PCI, an IP address, and a third identifier. Several implementation methods in which several types of identifiers of the IAB node are adopted are illustrated below.

Method 1: the MT identifier of the IAB node is an F1AP ID, for example, gNB-CU UE F1AP ID and/or gNB-DU UE F1AP ID. The IAB node may acquire the F1AP ID for identifying the IAB node 1 MT part using the following method.

1. The CU sends the F1AP ID to the MT part of the IAB node 1 through an RRC message.

2. The CU sends the F1AP ID to the IAB node 1 through an F1 signaling. The F1 signaling may be non-UE-related F1 signaling or UE-related F1 signaling. In exemplary implementations of the present embodiment, the F1 signaling may include an F1AP ID for identifying the IAB node 1 MT part and a corresponding C-RNTI of the IAB node 1 MT part. In exemplary implementations of the present embodiment, the MT part of the IAB node 1 may send the gNB-DU ID of the corresponding DU part to the CU through an RRC message.

3. The IAB node 2 sends the F1AP ID to the IAB node 1 through an F1 signaling. In exemplary implementations of the present embodiment, the F1 signaling may include an F1 AP ID for identifying the IAB node 1 MT part and a corresponding C-RNTI of the IAB node 1 MT part. In exemplary implementations of the present embodiment, the MT part of the IAB node 1 may send the gNB-DU ID of the corresponding DU part to the CU through an RRC message, and the CU may send the gNB-DU ID of the DU part of the IAB node 1 to the IAB node 2 (the parent IAB node B of the IAB node 1) through an F1 message.

4. The IAB node 2 sends the F1AP ID to the IAB node 1 through an RRC message or a MAC CE.

Figure 1:
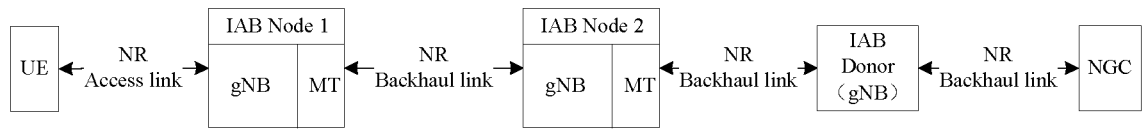
FIG. 1 is a schematic diagram of an IAB scenario in which a (Centralized Unit) CU/DU is not separately deployed according to the relevant art.
Figure 2:
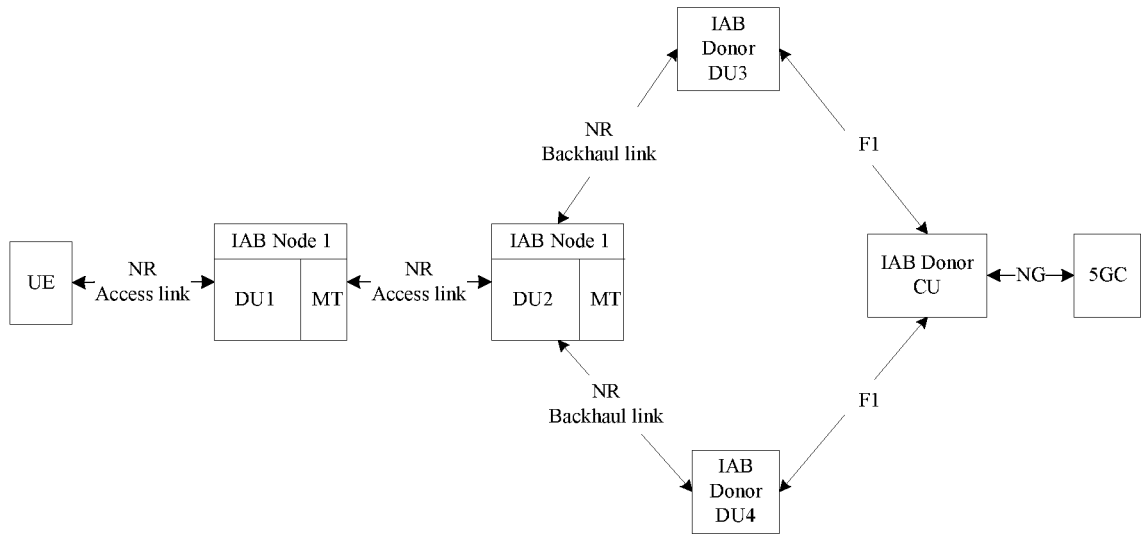
FIG. 2 is a schematic diagram of an IAB scenario in which a CU/DU is separately deployed according to the relevant art.

Method 2: the MT identifier of the IAB node is a cell identifier (for example, NCGI or PCI)+C-RNTI, or a gNB-DU ID+C-RNTI. The cell identifier or the gNB-DU ID may be a cell identifier or a gNB-DU ID of a parent IAB node of the IAB node, i.e. a cell identifier or a gNB-DU ID of an IAB node allocating a C-RNTI to the IAB node MT part, in the schematic diagram for the method of the present embodiment as shown in FIG. 1, this the IAB node allocating the C-RNTI to the IAB node MT part is the IAB node 2.

Method 3: the MT identifier of the IAB node is a gNB-DU ID, i.e. the gNB-DU ID of the IAB node 1.

In exemplary implementations of the present embodiment, the gNB-DU+index may be used as the MT identifier of the IAB node, wherein the index is an index number or a number. In exemplary implementations of the present embodiment, the MT part of the IAB node 1 may send the gNB-DU ID and/or index of the corresponding DU part to the CU through an RRC message, and the CU may send the gNB-DU ID and/or index of the DU part of the IAB node 1 to the IAB node 2 (the parent IAB node of the IAB node 1) through an F1 message.

Method 4: the MT identifier of the IAB node is allocated by the CU-CP or the CU

In this case, the IAB node 1 may acquire the MT identifier of the IAB node 1 by the following method: the CU-CP sends the MT identifier of the IAB node to the MT part of the IAB node 1 through an RRC message; alternatively, after acquiring the MT identifier of the IAB node, the IAB node 2 sends the acquired MT identifier to the MT part of the IAB node 1.

The IAB node 2 may acquire the MT identifier of the IAB node 1 in the following manner: the CU-CP sends the MT identifier of the IAB node 1 to the IAB node 2 through an F1 message (for example, a UE associated F1 message).

Method 4: the MT identifier of the IAB node is allocated by the IAB node 2

In this case, the IAB node 1 may acquire the MT identifier of the IAB node 1 by the following method: the IAB node 2 sends the MT identifier of the IAB node 1 to the IAB node 1 MT part through an RRC message or a MAC CE; alternatively, the CU-CP acquires the MT identifier of the IAB node 1 from the IAB node 2, and then sends the MT identifier of the IAB node 1 to the IAB node 1 MT part through an RRC message.

The CU-CP may acquire the MT identifier of the IAB node 1 through the following method: the IAB node 2 sends the MT identifier of the IAB node 1 to the CU-CP through an F1 message, for example, a UE associated F1 message.

In exemplary implementations of the present embodiment, in the above method, the donor DU may acquire a mapping relationship between the MT identifier of the IAB node 1 and the F1AP ID through the following method. The CU-CP sends the mapping relationship between the MT identifier of the IAB node 1 and the F1AP ID to the donor DU through, for example, a non-UE associated F1 signaling. In exemplary implementations of the present embodiment, when a new IAB node MT part accesses the CU, the CU allocates an F1AP ID and an MT identifier to the new IAB node MT part, and sends the mapping relationship between the MT identifier and the F1AP ID to the donor DU through an F1 signaling. In exemplary implementations of the present embodiment, the MT identifier of the IAB node 1 may be carried in the F1AP message between the donor DU and the donor CU used for forwarding the control plane signaling.

At operation 2, the IAB node 2 and the IAB node 3 forward the RRC message or F1 message generated by the IAB node 1 to the donor DU according to the information in the adaptation layer packet header. In exemplary implementations of the present embodiment, the IAB node 2 performs the F1AP protocol layer processing and encapsulation on the PDCP PDU parsed out, and then performs the adaptation layer processing and encapsulation.

At operation 3, the donor DU forwards the control plane information to the donor CU-CP through the F1-C interface.

Scenario 2

For downlink forwarding of a data packet (forwarding in the direction from the IAB donor to the IAB node 1 in FIG. 5), the following operations may be included.

In a downlink data forwarding process, after receiving, from the SRB, a data packet sent by the parent IAB node, the IAB node needs to judge whether to continue forwarding the data packet to the child IAB node or to parse the control plane signaling at the IAB node (i.e. delivering the data packet to the PDCP layer for processing, including an RRC message or an F1AP message). The following two judging methods are provided.

Method 1: judging according to a target identifier (e.g., an gNB-DU ID) in the adaptation layer packet header The donor DU can determine, according to the target IP address contained in the IP layer of the data packet received from the donor CU-CP and a mapping relationship between the IP address and the DU ID, target identifier information needing to be filled in the adaptation layer packet header; or the F1AP message received from the donor CU-CP may contain the target identifier information.

In FIG. 5, the target information contained in the adaptation layer packet header of the RRC message sent to the IAB node 1 MT part from the donor CU-CP is the identifier information of the IAB node 2. After receiving the data packet, the IAB node 2 sends the data packet to the IAB node 1, and after parsing the adaptation layer packet header, the IAB node 1 delivers the data packet to the PDCP layer for processing.

Method 2: judging according to the MT identifier of the IAB node in the adaptation layer packet header The F1 message sent by the donor CU-CP to the donor DU may contain the MT identifier of the IAB node. Alternatively, the donor CU-CP may configure, for the donor DU, a mapping relation between the F1AP ID and the MT identifier of the IAB node. The donor DU determines the MT identifier information of the IAB node that needs to be filled in the adaptation layer packet header.

In FIG. 5, the IAB node 2 determines that the UE or the IAB node MT part to which the data packet belongs is served by the IAB node 2 according to the MT identifier of the IAB node 2. After receiving the data packet, the IAB node 2 sends the data packet to the IAB node 1, and the IAB node 1 parses the adaptation layer packet header and then delivers the data packet to the PDCP layer for processing.

Figure 6:
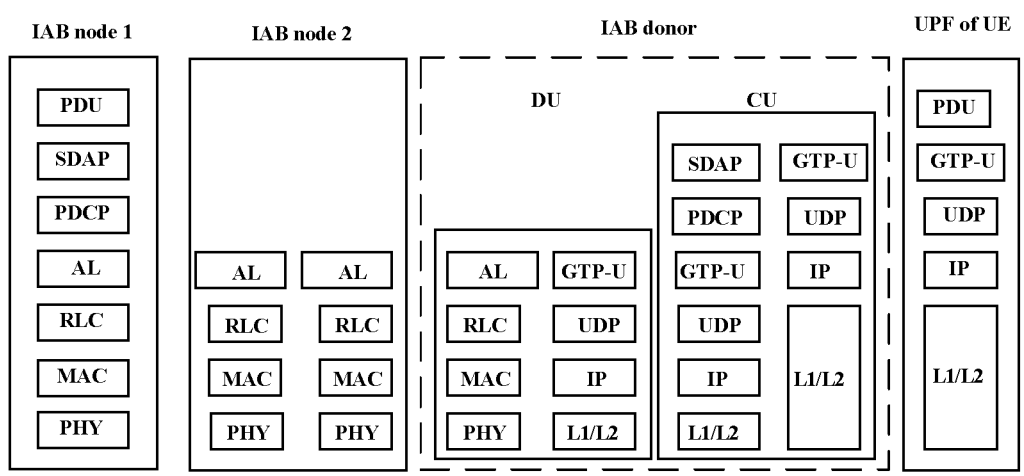
FIG. 6 is a schematic diagram of another IAB deployment scenario according to an embodiment of the present disclosure.

In the case where the control plane information (RRC message and F1AP message) of the IAB node is forwarded through the control plane (i.e., SRB), the IAB node performs the adaptation layer processing for all data packets. FIG. 6 is a schematic diagram of another IAB deployment scenario according to an embodiment of the present disclosure. The protocol stack between the IAB node and the IAB donor is shown in FIG. 6. In FIG. 6, the adaptation layer is located above the RLC layer of the IAB node and the IAB donor DU. It should be noted that the adaptation layer may also be located between the RLC layer and the MAC layer, or the adaptation layer functions may be located in the RLC layer or the MAC layer. There may also be an adaptation layer on the interface between the donor DU and the CU-CP, that is, the donor DU and the CU-CP perform corresponding adaptation layer processing. Unless otherwise specified, the donor CU in the present embodiment refers to a donor CU-CP. For the case where the separation of the CP and the UP of the CU is not considered, the donor CU-CP in the present embodiment is replaced by the donor CU. It should be noted that the SCTP/IP layer may also exist under the F1AP protocol layer. Note that there may be no RRC protocol layer between the F1AP protocol layer and the PDCP protocol layer. In addition, the adaptation layer in FIG. 6 terminates at the donor DU. The method in the present embodiment is also applicable to a case where the adaptation layer terminates at the donor CU/CU-CP. It should be noted that the method in the present embodiment is not limited to the protocol stack architecture shown in FIG. 6. In FIG. 6, the SDAP (Service Data Adaptation Protocol) represents a service data adaptation protocol layer.

Scenario 3

For uplink forwarding of a data packet (forwarding in the direction from the IAB node 1 to the IAB donor in FIG. 6), the following operations may be included.

The present embodiment may use the method described in scenario 1, and differs in that the IAB node 1 in scenario 1 generates control plane signaling (such as F1, RRC message, X2, Xn, S1, and NG interface messages), while in the present embodiment the IAB node generates a user plane data packet, and the identifier information of the IAB node 1 may also be a GTP TEID. In order to enable the IAB node 1 to acquire F1 GTP TEID for identifying the IAB node 1, The IAB node 2 or the CU-CP/CU-UP/CU may send the identifier (F1 GTP TEID) to the IAB node 1.

In the case where the identifier information of the IAB node 1 is allocated by a CU-CP/CU, the following method is further included.

1. The method for acquiring the identifier information (node identifier) of the IAB node 1 by the IAB node 1 may include: a CU-CP sends a UE ID to the MT part of the IAB node 1 through an RRC message; alternatively, after acquiring the UE ID, the IAB node 2 sends the UE ID to the MT part of the IAB node 1.

2. The method for acquiring the node identifier of the IAB node 2 may include: a CU-CP sends the UE ID to the IAB node 2 through an F1 message.

3. The CU-CP may send a mapping relationship between the GTP TEID and the UE ID to the donor DU, for example, through non-UE associated F1 signaling, so that the donor DU can acquire the mapping relationship between the node identifier of the IAB node 1 and the GTP TEID.

4. The method for acquiring the node identifier of the IAB node 1 by the CU-UP may include: the CU/CU-CP sends the node identifier of the IAB node 1 to the CU-UP through an E1 message.

In the case where the node identifier of the IAB node 1 is allocated by the IAB node 2, the following method is further included.

1. The method for acquiring the node identifier of the IAB node 1 by the IAB node 1 may include: the IAB node 2 sends UE ID to the IAB node 1 MT part through an RRC message/MAC CE; or upon receiving the UE ID from the IAB node 2, the CU-CP sends the UE ID to the IAB node 1 MT part in an RRC message.

2. The method for acquiring the node identifier of the IAB node 1 by the CU-CP may include: the IAB node 2 sends the UE ID to the CU-CP through an F1 message.

3. The donor DU may acquire the mapping relationship between the node identifier of the IAB node 1 and the F1AP ID (the CU-CP acquires the mapping relationship between the F1AP ID and the node identifier of the IAB node 1 and then sends the mapping relationship to the donor DU through an F1 signaling), or the F1AP message used for forwarding the control plane signaling carries the node identifier of the IAB node 1.

4. The method for acquiring the node identifier of the IAB node 1 by the CU-UP may include: after acquiring the node identifier of the IAB node 1, the CU/CU-CP sends the node identifier of the IAB node 1 to the CU-UP through an E1 message.

In the case where the node identifier of the IAB node 1 is an identifier allocated by a CU-UP, the following method is further included.

1. The method for acquiring the node identifier of the IAB node 1 by the CU-CP may include: the CU-UP sends the node identifier of the IAB node 1 to the CU-CP through an E1 message.

2. The method for acquiring the node identifier of the IAB node 1 by the IAB node 1 may include: the IAB node 2 sends the node identifier of the IAB node 1 to the IAB node 1 through an RRC message/MAC CE; or the CU-CP sends the node identifier of the IAB node 1 to the IAB node 1 through an RRC message.

3. The method for acquiring the node identifier of the IAB node 1 by the IAB node 2 may include: the CU-CP sends the node identifier of the IAB node 1 to the IAB node 2 through an F1 message.

4. The donor DU acquires a mapping relationship between the node identifier of the IAB node 1 and the TEID (the CU-CP acquires the mapping relationship and then sends the mapping relationship to the donor DU through the F1 signaling), or the GTP-U packet header of the data packet transmitted between the donor DU and the donor CU carries the node identifier of the IAB node 1.

Figure 7:
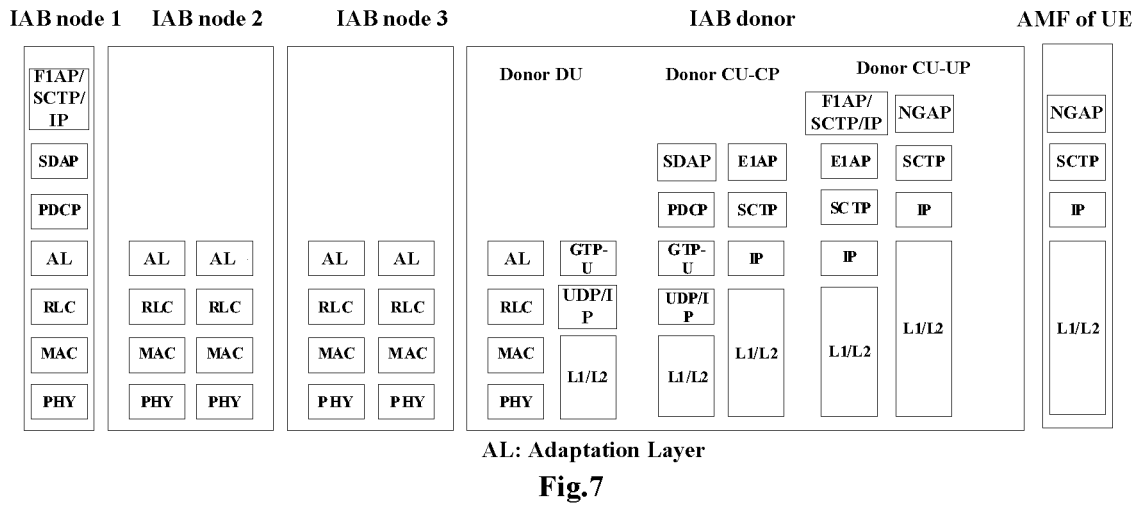
FIG. 7 is a schematic diagram of another IAB deployment scenario according to an embodiment of the present disclosure.

FIG. 7 is a schematic diagram of another IAB deployment scenario according to an embodiment of the present disclosure. As shown in FIG. 7, in the case where the control plane information (RRC message and F1AP message) of the IAB node is forwarded by the user plane (i.e. DRB), the IAB node performs the adaptation layer processing on all the data packets. It should be noted that the method of the present embodiment is not limited to the protocol stack architecture of FIG. 5. In FIG. 7, an Access and Mobility Management Function (AMF) represents an access and mobility management module. E1 AP represents an E1 interface access point. NGAP represents an NG interface access point.

In exemplary implementations of the present embodiment, the CU or the CU-CP may configure, for the IAB node, a DRB or a DRB set dedicated to transmission of control signaling, and if there is a message sent through the dedicated DRB, it indicates that the message is control signaling. The DRB dedicated to the transmission of the control signaling may be provided with a specific DRB ID, or the DRB dedicated to the transmission of the control signaling in the bearer information configured by the CU for the IAB node IMT part is associated with control plane indication information.

For identifier information of the IAB node carried in the adaptation layer packet header, reference may be made to the method in the foregoing scenario.

By means of the method, the problem in the related art that it is difficult to realize data sending and receiving through control signaling in an IAB architecture can be solved, and the effect of enabling the control signaling to be correctly sent and received is achieved.

Through the description of the foregoing embodiments, a person skilled in the art may clearly understand that the method according to the foregoing embodiments may be implemented by software in addition to a necessary general-purpose hardware platform, and may alternatively be implemented by hardware. However, in many cases, the former is a preferred implementation. Based on such understanding, the essence of the technical solutions of the embodiments of the present disclosure, or the part of the technical solutions of the embodiments of the present disclosure contributing to the related art, may be embodied in the form of a software product. The computer software product may be stored in a storage medium (such as a ROM/RAM, a magnetic disk and an optical disk), including several instructions for enabling a terminal device (which may be a mobile phone), a computer, a server, or a network device to execute the method provided in the embodiments of the present disclosure.

Embodiment 2

Figure 8:
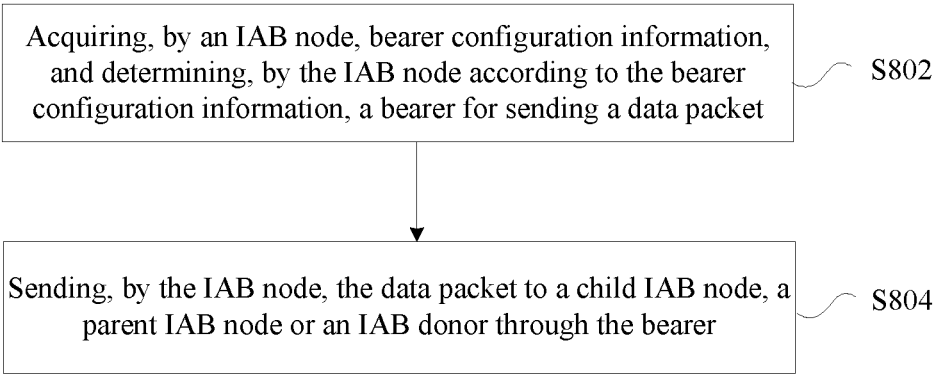
FIG. 8 is a flowchart of another method for sending a data packet according to an embodiment of the present disclosure.

The present embodiment provides a method for sending a data packet in the mobile terminal shown in FIG. 3. FIG. 8 is a flowchart of another method for sending a data packet according to an embodiment of the present disclosure. As shown in FIG. 8, the flow includes the following operations.

At S802, an IAB node acquires bearer configuration information, and determines, according to the bearer configuration information, a bearer for sending a data packet.

At S804, the IAB sends the data packet to a child IAB node or a parent IAB node or an IAB donor through the bearer.

In exemplary implementations of the present embodiment, the bearer configuration information at least includes one of the following information: a bearer identifier containing a DRB ID or an SRB ID; indication information indicating whether an adaptation layer needs to be parsed; indication information indicating F1AP encapsulation; indication information indicating GTP-U encapsulation; indication information indicating PDCP processing; indication information indicating a protocol type of a data packet borne by an associated bearer; indication information indicating whether a data packet borne by an associated bearer is a forwarded data packet; indication information indicating that an associated bearer is used for forwarding.

In exemplary implementations of the present embodiment, the indication information indicating the F1AP encapsulation at least includes one of the following: indication information indicating whether the F1AP encapsulation needs to be executed; indication information indicating whether the F1AP encapsulation has been executed.

In exemplary implementations of the present embodiment, the indication information indicating the GTP-U encapsulation at least includes one of the following: indication information indicating whether the GTP-U encapsulation needs to be executed; indication information indicating whether the GTP-U encapsulation has been executed.

In exemplary implementations of the present embodiment, the indication information indicating the PDCP processing at least includes one of the following: indication information indicating whether the PDCP processing needs to be executed; indication information indicating whether the PDCP processing has been executed.

In exemplary implementations of the present embodiment, the indication message for indicating the protocol type of the data packet borne by the associated bearer at least includes one of the following: indication information indicating that the associated bearer is used for bearing the F1AP message; indication information indicating that the associated bearer is used for bearing the RRC message.

In exemplary implementations of the present embodiment, the bearer identifier may be used to implicitly indicate at least one of the following: indicating whether an adaptation layer needs to be parsed; indicating whether the F1AP protocol layer processing needs to be executed; indicating whether the GTP-U protocol layer processing needs to be executed; indicating whether the PDCP protocol layer processing needs to be executed; indicating whether the F1AP protocol layer processing has been executed; indicating whether the GTP-U protocol layer processing has been executed; indicating whether the PDCP protocol layer processing has been executed; indicating that the associated bearer is used for bearing the F1AP message; indicating that the associated bearer is used for bearing the RRC message; indicating that the associated bearer is used for bearing a forwarded data packet; indicating that the associated bearer is used for bearing a non-forwarded data packet.

In exemplary implementations of the present embodiment, before the IAB node acquires the bearer configuration information, the IAB node sends indication information to a CU through an RRC message or an F1 message, wherein the indication information is IAB node indication information or is used for requesting the bearer configuration information for the IAB node. Herein, the IAB node indication information is used for indicating to the CU that the sender of the message is the IAB node.

In exemplary implementations of the present embodiment, the operation that the IAB node acquires the bearer configuration information includes: the IAB node acquires the bearer configuration information from a CU through an RRC message, or the IAB node acquires the bearer configuration information from a CU through an F1 message.

In exemplary implementations of the present embodiment, the RRC message or the F1 message includes identifier information of the IAB node.

Embodiment 3

Figure 9:
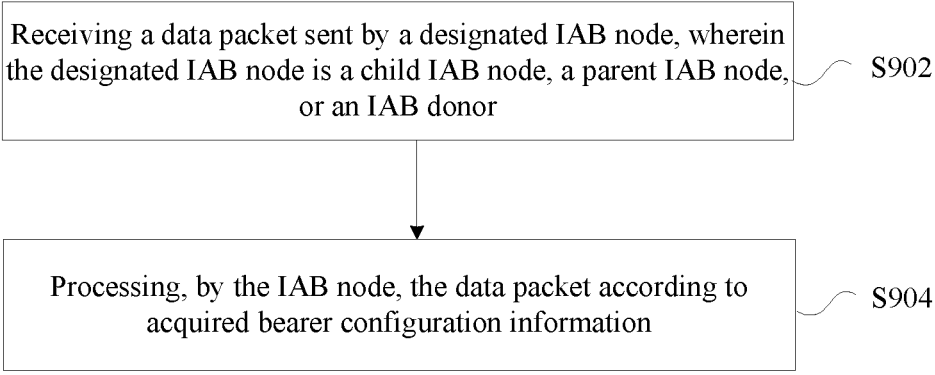
FIG. 9 is a flowchart of a method for receiving a data packet according to an embodiment of the present disclosure.

The present embodiment provides a method for receiving a data packet in the mobile terminal shown in FIG. 3. FIG. 9 is a flowchart of a method for receiving a data packet according to an embodiment of the present disclosure. As shown in FIG. 9, the flow includes the following operations.

At S902, a data packet sent by a second designated IAB node is received, wherein the second designated IAB node is a child IAB node, a parent IAB node, or an IAB donor.

At S904, the data packet is processed according to acquired bearer configuration information.

In exemplary implementations of the present embodiment, the operation that the data packet is processed according to the acquired bearer configuration information includes: the IAB node judges, according to the bearer configuration information, whether to perform adaptation layer parsing on the data packet; or, the IAB node judges, according to the bearer configuration information, whether to perform F1AP protocol layer processing on the data packet; or, the IAB node judges, according to the bearer configuration information, whether to perform GTP-U protocol layer processing on the data packet; or, the IAB node judges, according to the bearer configuration information, whether to perform PDCP protocol layer processing on the data packet.

Specifically, for Embodiment 2 and Embodiment 3, the following scenarios are further provided, so as to facilitate the understanding of the technical solutions of the foregoing two embodiments.

Figure 10:
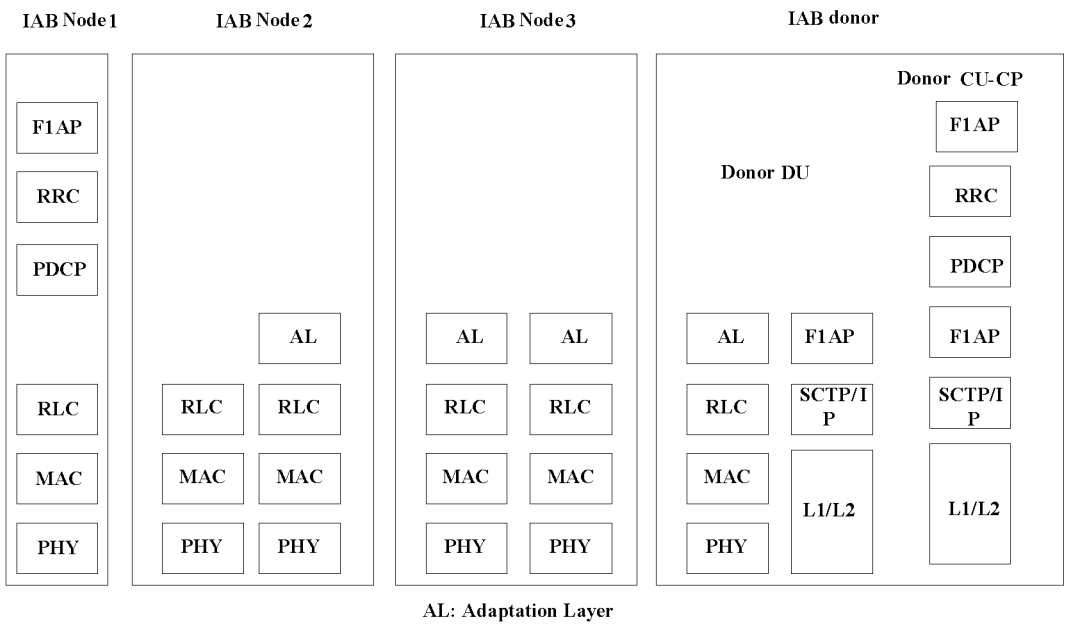
FIG. 10 is a schematic diagram of another IAB deployment scenario according to an embodiment of the present disclosure.

In the case where the control plane information (RRC message and F1AP message) of the IAB node is forwarded through the control plane SRB, the IAB node does not perform adaptation layer processing on the data packet generated by the IAB node. FIG. 10 is a schematic diagram of another IAB deployment scenario according to an embodiment of the present disclosure. The protocol stack between the IAB node and the IAB donor is shown in FIG.

10. In FIG. 10, the adaptation layer is above the RLC layer of the IAB node and the IAB donor DU. It should be noted that the adaptation layer may also be located between the RLC layer and the MAC layer, or the adaptation layer functions may be located in the RLC layer or the MAC layer. There may also be an adaptation layer on the interface between the donor DU and the CU-CP, that is, the donor DU and the CU-CP perform corresponding adaptation layer processing. Unless otherwise specified, the donor CU in the present embodiment refers to a donor CU-CP. For the case where the separation of the CP and the UP of the CU is not considered, the donor CU-CP in the present embodiment is replaced by the donor CU. It should be noted that the SCTP/IP layer may also exist under the F1AP protocol layer. Note that there may be no RRC protocol layer between the F1AP protocol layer and the PDCP protocol layer. In addition, the adaptation layer terminates at the donor DU in FIG. 10. The method in the present embodiment is also applicable to a case where the adaptation layer terminates at the donor CU/CU-CP.

Scenario 1

For uplink forwarding of a data packet (forwarding in the direction from the IAB node 1 to the IAB donor in FIG. 10), the following operations may be included.

After the DU part of the IAB node 1 generates the F1 message, optionally, the IAB node 1 executes RRC layer processing; or the MT part of the IAB node 1 generates an RRC message and the IAB node 1 executes RRC layer processing; or the MT part of the IAB node 1 generates an RRC message. The IAB node 1 performs PDCP, RLC, MAC, and Physical Layer (PHY) layer processing on the RRC message or F1 message and then sends the processed message to the IAB node 2. In exemplary implementations of the present embodiment, the F1 message generated by the IAB node 1 includes the identifier information of the source node and/or the identifier information of the target node. In exemplary implementations of the present embodiment, if the IAB node 1 generates control plane signaling of another interface (for example, X2, Xn, S1, NG interface signaling), the control plane signaling includes the identifier information of the source node and/or the identifier information of the target node. In exemplary implementations of the present embodiment, the PDCP PDU of the control plane signaling data packet contains protocol type indication information indicating a protocol type borne by the packet. The protocol type includes one of the following: RRC, F1AP, X2AP, XnAP, S1AP and NGAP. The IAB node 1 determines a bearer for sending the data packet to the IAB node 2 according to the acquired bearer configuration information. In exemplary implementations of the present embodiment, the IAB node sends indication information to the CU through an RRC message or an F1 message, wherein the indication information is used for indicating that the IAB node is an IAB node, or indicating that the IAB node needs bearer configuration information. The CU may send the bearer configuration information to the IAB node through an RRC message or an F1 message.

The bearer configuration information at least includes one of the following: a bearer identifier, including a DRB ID or an SRB ID; indication information indicating whether an adaptation layer needs to be parsed; indication information indicating whether F1AP encapsulation needs to be executed; indication information indicating whether PDCP processing needs to be executed; indication information indicating whether F1AP encapsulation has been executed; indication information indicating whether PDCP processing has been executed; indication information indicating that an associated bearer is used for bearing an F1AP message; indication information indicating that the associated bearer is used for bearing an RRC message; indication information indicating that the associated bearer is used for bearing a forwarded data packet; indication information indicating that the associated bearer is used for bearing a non-forwarded data packet.

The bearer identifier may indicate, based on a default rule or a predefined rule, at least one of the following: indicating whether the adaptation layer needs to be parsed; indicating whether F1AP protocol layer processing needs to be executed; indicating whether PDCP protocol layer processing needs to be executed; indicating whether F1AP protocol layer processing has been executed; indicating whether PDCP protocol layer processing has been executed; indicating that the associated bearer is used for bearing the F1AP message; indicating that the associated bearer is used for bearing the RRC message; indicating that the associated bearer is used for bearing a forwarded data packet; indicating that the associated bearer is used for bearing a non-forwarded data packet.

By means of the above method, the IAB node 1 does not perform adaptation layer processing and encapsulation on the RRC message or the F1AP message generated by the IAB node 1, and determines, according to the acquired bearer configuration information, a bearer for sending the RRC message or the F1AP message generated by the IAB node 1. The IAB node 2 may acquire the bearer configuration information through the RRC message or the F1 message, and judge, according to the bearer configuration information and the bearer to which the received data packet belongs, whether to parse the adaptation layer. Then, the IAB node 2 performs encapsulation at the adaptation layer, and the information contained in the adaptation layer packet header is the same as the information for the scenario in the Embodiment 1.

Scenario 2

For downlink forwarding of a data packet (the forwarding in the direction from the IAB donor to the IAB node 1 in FIG. 10), the following operations may be included.

The IAB node needs to judge whether the data packet sent to the child IAB node needs to contain an adaptation layer packet header. Whether the data packet needs to contain the adaptation layer packet header may be judged according to the target identifier or the UE identifier or the IAB node MT identifier in the adaptation layer packet header. Specifically, if the IAB node judges that the UE identifier or the MT identifier belongs to the UE or IAB node served by the IAB node, or if the target of the data packet is the IAB node, then the data packet sent to the child IAB node or the UE does not include an adaptation layer packet header, and the IAB node determines, according to the acquired bearer configuration information, a bearer for sending the data packet to the child IAB node. In exemplary implementations of the present embodiment, the IAB node sends indication information to the CU through an RRC message or an F1 message, wherein the indication information is used for indicating that the IAB node is an IAB node, or the IAB node needs bearer configuration information. The CU may send the bearer configuration information to the IAB node through an RRC message or an F1 message.

The bearer configuration information at least includes one of the following: a bearer identifier, including DRB ID or SRB ID; indication information indicating whether an adaptation layer needs to be parsed; indication information indicating whether F1AP encapsulation needs to be executed; indication information indicating whether PDCP processing needs to be executed; indication information indicating whether F1AP encapsulation has been executed; indication information indicating whether PDCP processing has been executed; indication information indicating that an associated bearer is used for bearing an F1AP message; indication information indicating that the associated bearer is used for bearing an RRC message; indication information indicating that the associated bearer is used for bearing a forwarded data packet; and indication information indicating that the associated bearer is used for bearing a non-forwarded data packet.

The bearer identifier may be used for implicitly indicating at least one of the following: indicating whether an adaptation layer needs to be parsed; indicating whether F1AP protocol layer processing needs to be executed; indicating whether PDCP protocol layer processing needs to be executed; indicating whether F1AP protocol layer processing has been executed; indicating whether PDCP protocol layer processing has been executed; indicating that an associated bearer is used for bearing an F1AP message; indicating that the associated bearer is used for bearing an RRC message; indicating that the associated bearer is used for bearing a forwarded data packet; indicating that the associated bearer is used for bearing a non-forwarded data packet.

After receiving the downlink data packet, the IAB node needs to judge whether to perform adaptation layer parsing on the received data packet. In exemplary implementations of the present embodiment, the IAB node may judge, according to the bearer configuration information and the bearer to which the received data packet belongs, whether to perform adaptation layer parsing on the received data packet. If the IAB node judges that it is unnecessary to parse the adaptation layer, the IAB node directly delivers the data packet to the PDCP layer for processing; otherwise, the IAB node sends the data packet to the next-hop node after processing the data packet at the adaptation layer.

Figure 11:
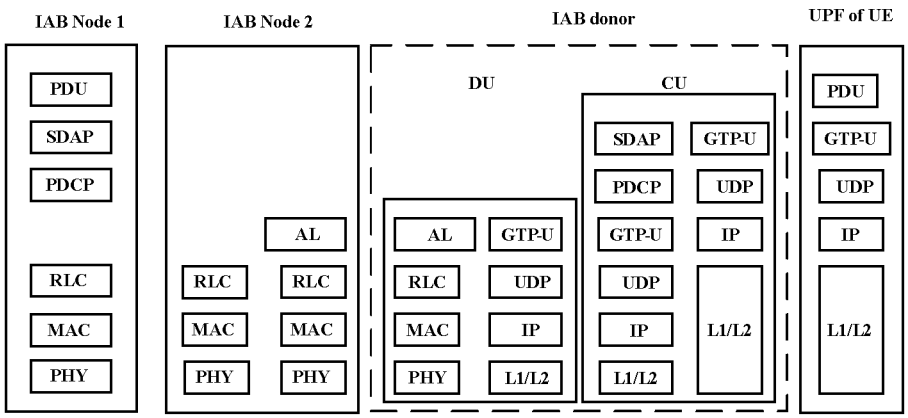
FIG. 11 is a schematic diagram of another IAB deployment scenario according to an embodiment of the present disclosure.

In a user plane data packet forwarding scenario, the IAB node does not perform adaptation layer processing on the data packet generated by the IAB node. The protocol stack between the IAB node and the IAB donor is shown in FIG. 4. In FIG. 4, the adaptation layer is located above the RLC layer of IAB node and IAB donor DU. It should be noted that the adaptation layer (or adaptor layer) may also be located between the RLC layer and the MAC layer, or the adaptation layer functions may be located at the RLC layer or the MAC layer. There may also be an adaptation layer on the interface between the donor DU and the CU-UP, that is, the donor DU and the CU-UP execute corresponding adaptation layer processing. Unless otherwise specified, the donor CU in the present embodiment refers to a donor CU-UP. For the case where the separation of the CP and the UP of the CU is not considered, the donor CU-UP in the present embodiment is replaced by the donor CU. In addition, the adaptation layer terminates at the donor DU in FIG. 11. The method in the present embodiment is also applicable to a case where the adaptation layer terminates at the donor CU/CU-UP. It should be noted that the method of the present embodiment is not limited to the protocol stack architecture as shown in FIG. 4. In FIG. 11, UDP indicates User Datagram Protocol.

Scenario 3

For uplink forwarding of a data packet (forwarding in the direction from the IAB node 1 to the IAB donor in FIG. 11), the following operations may be included.

In the uplink data process, after the IAB node 1 generates the user plane data packet, the IAB node 1 does not perform adaptation layer processing and sends the user plane data packet to the IAB node 2 through the DRB. The IAB node 1 determines, according to the acquired bearer configuration information, a bearer for sending the data packet to the IAB node 2. In exemplary implementations of the present embodiment, the IAB node sends indication information to the CU through an RRC message or an F1 message, wherein the indication information is used for indicating that the IAB node is an IAB node, or the IAB node needs bearer configuration information. The CU may send the bearer configuration information to the IAB node through an RRC message or an F1 message. The bearer configuration information at least includes one of the following:

a bearer identifier, containing a DRB ID or an SRB ID;
indication information indicating whether an adaptation layer needs to be parsed;
indication information indicating that an associated bearer is used for bearing a forwarded data packet;
indication information indicating that the associated bearer is used for bearing a non-forwarded data packet.

The bearer identifier may indicate, based on a default rule or a predefined rule, at least one of the following:

indicating whether the adaptation layer needs to be parsed;
indicating that the associated bearer is used for bearing a forwarded data packet;
indicating that the associated bearer is used for bearing a non-forwarded data packet.

Through the above method, the IAB node 1 does not perform adaptation layer processing and encapsulation on the user plane data packet generated by the IAB node 1, and determines, according to the acquired bearer configuration information, the bearer used for sending the user plane data packet generated by the IAB node 1. The IAB node 2 may also acquire the bearer configuration information through an RRC message or an F1 message, and determine, according to the bearer configuration information and the bearer to which the received data packet belongs, whether to parse the adaptation layer. Then, the IAB node 2 performs encapsulation at the adaptation layer, and the information contained in the adaptation layer packet header is the same as that in the Embodiment 1.

Scenario 4

For downlink forwarding of a data packet (forwarding in the direction from the IAB donor to the IAB node 1 in FIG. 11), the following operations may be included.

The method for forwarding downlink data in this scenario is the same as the method for forwarding downlink data in scenario 2.

Figure 12:
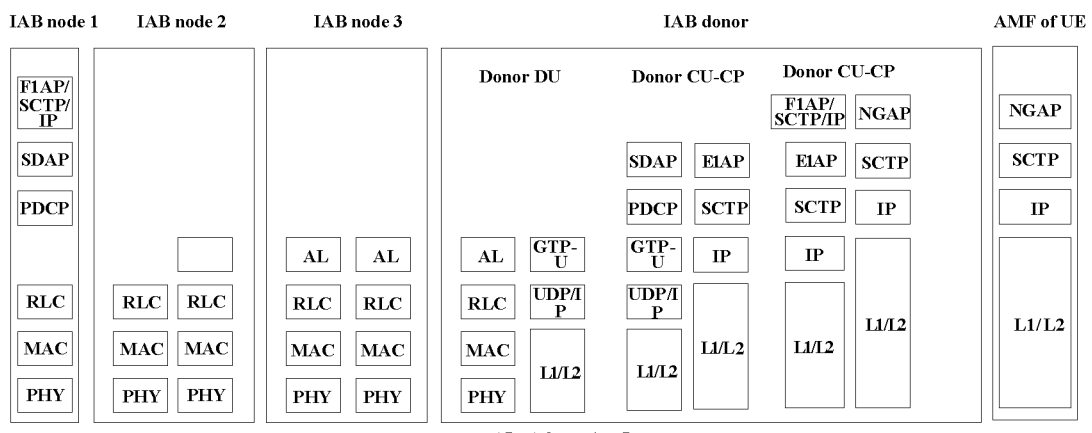
FIG. 12 is a schematic diagram of another IAB deployment scenario according to an embodiment of the present disclosure.

FIG. 12 is a schematic diagram of another IAB deployment scenario according to an embodiment of the present disclosure.

Scenario 5

In the case where the control plane information (RRC message and F1AP message) of the IAB node is forwarded through the user plane (i.e. DRB), the IAB node does not perform adaptation layer processing on the data packet generated by the IAB node. FIG. 12 is a schematic diagram of another IAB deployment scenario according to an embodiment of the present disclosure. It should be noted that the method of the present embodiment is not limited to the protocol stack architecture of FIG. 12.

The CU may send the bearer configuration information to the IAB node through an RRC message or an F1 message. For content of the bearer configuration information, reference may be made to the description in Embodiment 2. For example, the IAB node may determine whether to perform adaptation layer parsing on the received data packet in the following two methods.

Method 1: three dedicated DRB sets are configured

The DRB set 1 is used for indicating that what is borne is a control plane data packet, and a next-hop IAB node does not parse an adaptation layer. The DRB set 2 is used for indicating that what is borne is a user plane data packet (a user plane data packet generated by the MT part of the IAB node 1), and the next-hop IAB node does not parse the adaptation layer. The DRB set 3 is used for indicating that what is borne is a control plane data packet (forwarded CP signaling), and the next-hop IAB node needs to parse the adaptation layer.

Method 2: one dedicated DRB set is configured

The dedicated DRB set is used for distinguishing whether the next-hop IAB node needs to analyze the adaptation layer.

Scenario 6

This embodiment describes a bearer mapping method in a case where the control plane signaling is forwarded through the SRB. In exemplary implementations of the present embodiment, the IAB node or the IAB donor may use one or a combination of the following methods.

Method 1: for an RRC message from a UE and an IAB node MT part, the IAB node or the IAB donor may acquire, according to a logical channel or a bearer identifier corresponding to the data packet of the received RRC message, a logical channel priority corresponding to the channel, and the IAB node may forward the data packet by mapping the data packet to an SRB corresponding to the logical channel priority.

Method 2: for an F1AP message, both DU and CU have a capability of identifying DSCP for an IP header, a mapping relationship between the DSCP and the logical channel priority can be configured for an IAB node or an IAB donor (DU or CU), and the IAB node or the IAB donor can map a data packet to a corresponding SRB according to the mapping relationship. Similarly, the X2-C, S1-C and NG-C signaling may also adopt a similar method.

Method 3: the IAB node or the IAB donor acquires (for example, may acquire from a CU or a core network element) a mapping relationship between the logical channel priority and the DSCP, and then includes the DSCP in an adaptation layer packet header or an IP header according to the mapping relationship. After receiving the data packet, the IAB node or the IAB donor can determine the SRB to be mapped to according to the DSCP value.

Method 4: the system uniformly forwards the control signaling through the SRB1 or the SRB2 by default.

Method 5: the IAB node forwards the signaling using the SRB of the same type as the SRB to which the received signaling belongs.

Method 6: the system pre-configures an SRB dedicated for IAB signaling forwarding, and the configured information further includes default RLC-config of the SRB and logical channel configuration. The donor CU or the IAB donor or the serving IAB node may configure, for the MT part of the IAB node during the access of the IAB node, a PDCP configuration of the SRB dedicated for IAB signaling forwarding.

Method 7: a reflective mapping mechanism of DSCP→logical channel priority/SRB is adopted. For example, SRB2 may be used by default, but the specific SRB may be adjusted according to the reflective rule.

Scenario 7

This embodiment describes a bearer mapping method in a case where the control plane signaling is forwarded through the DRB.

In exemplary implementations of the present embodiment, for the following three types of control plane signaling: 1) RRC signaling of an access UE; 2) RRC signaling of an IAB node MT part; 3) F1-AP signaling of an IAB node DU part, a mapping method of DSCP→QFI→DRB may be adopted, and a mapping method of logical channel priority→logarithmic channel priority may also be adopted.

For the NG-C control signaling and the Xn-C signaling, a mapping method based on a QoS rule and a QoS profile may be adopted, or a mapping method based on a DSCP→QFI→DRB may be adopted.

Embodiment 4

The present embodiment provides a device for sending a data packet, which is configured to implement the described embodiments and implementations, and what has been described will not be elaborated. The term "module", as used hereinafter, is a combination of software and/or hardware capable of realizing a predetermined function. Although the device described in the following embodiment is preferably implemented by software, implementation of hardware or a combination of software and hardware is also possible and conceivable.

Figure 13:
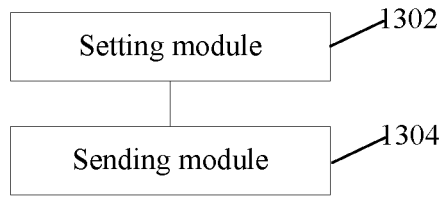
FIG. 13 is a structural block diagram of a device for sending a data packet according to an embodiment of the present disclosure.

FIG. 13 is a structural block diagram of a device for sending a data packet according to an embodiment of the present disclosure. As shown in FIG. 13, the device includes a setting module 1302 and a sending module 1304.

The setting module 1302 is configured to add an adaptation layer packet header to a data packet.

The sending module 1304 is configured to send the data packet to a next-hop IAB node, wherein the data packet is a control plane signaling or a user plane data packet.

In exemplary implementations of the present embodiment, the device further includes: a first acquiring module, configured to acquire identifier information of the IAB node, wherein the setting module is further configured to set the identifier information in the added adaptation layer packet header.

In exemplary implementations of the present embodiment, the first acquiring module is further configured to acquire the identifier information from a CU through an RRC message, or acquire the identifier information through an F1 message, or acquire the identifier information from a parent IAB node through a MAC CE.

In exemplary implementations of the present embodiment, the device may further include: a second acquiring module, configured to acquire IAB node indication information from a CU through an F1 message.

It should be noted that each module may be implemented by software or hardware. The latter may be implemented in the following manner, but is not limited thereto: all the modules are located in a same processor; alternatively, the modules are located in different processors in an arbitrary combination.

Embodiment 5

The present embodiment provides a device for sending a data packet, which is configured to implement the described embodiments and implementations, and what has been described will not be elaborated. The term "module", as used hereinafter, is a combination of software and/or hardware capable of realizing a predetermined function. Although the device described in the following embodiment is preferably implemented by software, implementation of hardware or a combination of software and hardware is also possible and conceivable.

Figure 14:
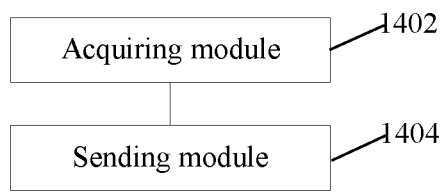
FIG. 14 is a structural block diagram of another device for sending a data packet according to an embodiment of the present disclosure.

FIG. 14 is a structural block diagram of another device for sending a data packet according to an embodiment of the present disclosure. As shown in FIG. 14, the device includes an acquiring module 1402 and a sending module 1304.

The acquiring module 1402 is configured to acquire bearer configuration information, and determine a bearer used for sending a data packet according to the bearer configuration information.

The sending module 1404 is configured to send the data packet to a child IAB node or a parent IAB node or an IAB donor through the bearer.

In exemplary implementations of the present embodiment, the bearer configuration information at least includes one of the following information: a bearer identifier containing a DRB ID or an SRB ID; indication information indicating whether an adaptation layer needs to be resolved; indication information indicating F1AP encapsulation; indication information indicating GTP-U encapsulation; indication information indicating PDCP processing; indication information indicating a protocol type of a data packet borne by an associated bearer; indication information indicating whether a data packet borne by the associated bearer is a forwarded data packet; indication information indicating that the associated bearer is used for forwarding.

In exemplary implementations of the present embodiment, the device may further include: a requesting module, configured to send indication information to a CU through an RRC message or an F1 message, wherein the indication information is IAB node indication information, or is used for requesting the bearer configuration information for the IAB node, and the IAB node indication information is used to indicate to the CU that the sender of the message is the IAB node.

In exemplary implementations of the present embodiment, the acquiring module is further configured to acquire the bearer configuration information from a CU through an RRC message, or acquire the bearer configuration information from the CU through an F1 message.

It should be noted that each module may be implemented by software or hardware. The latter may be implemented in the following manner, but is not limited thereto: all the modules are located in a same processor; alternatively, the modules are located in different processors in an arbitrary combination.

Embodiment 6

The present embodiment provides a device for receiving a data packet, which is configured to implement the described embodiments and implementations, and what has been described will not be elaborated. The term "module", as used hereinafter, is a combination of software and/or hardware capable of realizing a predetermined function. Although the device described in the following embodiment is preferably implemented by software, implementation of hardware or a combination of software and hardware is also possible and conceivable.

Figure 15:
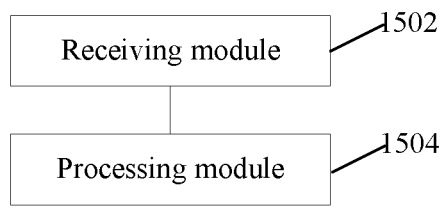
FIG. 15 is a structural block diagram of a device for receiving a data packet according to an embodiment of the present disclosure.

FIG. 15 is a structural block diagram of a device for receiving a data packet according to an embodiment of the present disclosure. As shown in FIG. 15, the device includes a receiving module 1502 and a processing module 1504.

The receiving module 1502 is configured to receive a data packet sent by a second designated IAB node, wherein the second designated IAB node is a child IAB node, a parent IAB node, or an IAB donor.

The processing module 1504 is configured to process the data packet according to acquired bearer configuration information.

In exemplary implementations of the present embodiment, the processing module 1504 is further configured to: judge, according to the bearer configuration information, whether to perform adaptation layer parsing on the data packet, or judge, according to the bearer configuration information, whether to perform F1AP protocol layer processing on the data packet, or judge, according to the bearer configuration information, whether to perform GTP-U protocol layer processing on the data packet, or judge, according to the bearer configuration information, whether to perform PDCP protocol layer processing on the data packet.

It should be noted that each module may be implemented by software or hardware. The latter may be implemented in the following manner, but is not limited thereto: all the modules are located in a same processor; alternatively, the modules are located in different processors in an arbitrary combination.

Embodiment 7

The present embodiment provides a data packet transmission system. The system is used for implementing the described embodiments and implementations, and what has been described will not be elaborated herein.

Figure 16:
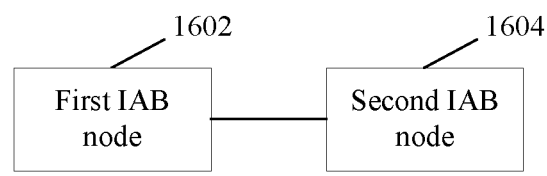
FIG. 16 is a structural diagram of a data packet transmission system according to an embodiment of the present disclosure.

FIG. 16 is a structural diagram of a data packet transmission system according to an embodiment of the present disclosure. As shown in FIG. 16, the system includes a first IAB node 1602 and a second IAB node 1604.

The first IAB node 1602 is configured to add an adaptation layer packet header to a data packet, and send the data packet to the second IAB node 1602.

The second IAB node 1604 is configured to receive the data packet containing the adaptation layer packet header.

In the embodiment, the data packet is a control plane signaling or a user plane data packet.

Embodiment 8

The present embodiment provides another data packet transmission system. The system is used for implementing the foregoing embodiments and implementations, and what has been described will not be elaborated herein.

Figure 17:
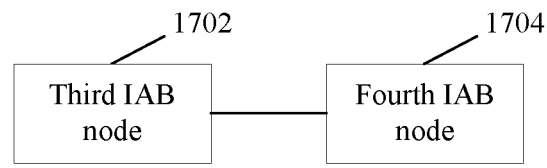
FIG. 17 is a structural diagram of another data packet transmission system according to an embodiment of the present disclosure.

FIG. 17 is a structural diagram of a data packet transmission system according to an embodiment of the present disclosure. As shown in FIG. 17, the system includes a third IAB node 1702 and a fourth IAB node 1704.

The third IAB node 1702 is configured to acquire bearer configuration information, determine, according to the bearer configuration information, a bearer for sending a data packet, and send the data packet to the fourth IAB node 1704 through the bearer.

The fourth IAB node 1704 is configured to receive the data packet sent by the third IAB node 1702, acquire the bearer configuration information, and process the data packet according to the bearer configuration information, wherein the fourth IAB node 1704 is a child IAB node or a parent IAB node of the third IAB node 1702.

Embodiment 9

The present embodiment provides another data packet transmission system. The system is used for implementing the foregoing embodiments and implementations, and what has been described will not be elaborated herein.

Figure 18:
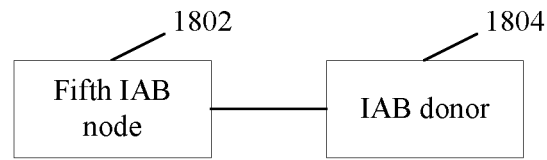
FIG. 18 is a structural diagram of another data packet transmission system according to an embodiment of the present disclosure.

FIG. 18 is a structural diagram of another data packet transmission system according to an embodiment of the present disclosure. As shown in FIG. 18, the system includes a fifth IAB node 1802 and an IAB donor 1804.

The fifth IAB node 1802 is configured to acquire bearer configuration information, determine, according to the bearer configuration information, a bearer for sending a data packet, and send the data packet to the IAB donor 1804 through the bearer.

The IAB donor 1804 is configured to receive the data packet sent by the fifth IAB node 1802.

Embodiment 10

The embodiment of the present disclosure provides a storage medium. The storage medium stores a computer program. The computer program is configured to execute the operations in any one of the method embodiments when running.

In exemplary implementations of the present embodiment, the storage medium may include, but is not limited to, any medium that can store a computer program, such as a USB flash drive, Read-Only Memory (ROM), Random Access Memory (RAM), a removable hard disk, a magnetic disk, or an optical disc.

Embodiment 11

The embodiment of the present disclosure provides an electronic device, including a memory and a processor. The memory stores a computer program. The processor is configured to run the computer program to execute operations in any one of the method embodiments.

In exemplary implementations of the present embodiment, the electronic device may further include a transmission device and an input/output device, wherein the transmission device is connected to the processor, and the input/output device is connected to the processor.

For specific examples in the present embodiment, reference may be made to the examples described in the foregoing embodiments and exemplary implementations, and details are not repeatedly described herein in the present embodiment.

By means of the scheme provided in the embodiments of the present disclosure, an adaptation layer packet header is added to a data packet generated by an IAB node or dedicated bearer configuration information is used, therefore the problem in the related art that it is difficult to realize data sending and receiving through control signaling in an IAB architecture can be solved, and the effect of enabling the control signaling to be correctly sent and received can be achieved.

Obviously, those skilled in the art should understand that the modules or operations of the present disclosure described above can be implemented by a general-purpose computing device. The modules or operations can be integrated on a single computing device or distributed on a network composed of a plurality of computing devices. Optionally, the modules or operations may be implemented by program code executable by a computing device, and thus may be stored in a storage device and executed by the computing device. Furthermore, in some cases, the operations shown or described may be performed in an order different from the order described in the present disclosure, or may be manufactured into individual integrated circuit modules, or a plurality of modules or operations thereof may be manufactured into individual integrated circuit modules. As such, the present disclosure is not limited to any particular hardware and software combination.

What is claimed is:

1. A method for sending a data packet, comprising:
    acquiring, by an Integrated Access and Backhaul Links (IAB) node, bearer configuration information from a Centralized Unit (CU), and determining, by the IAB node according to the bearer configuration information, a bearer for sending a data packet, wherein the bearer configuration information comprises indication information indicating a protocol type of the data packet borne by an associated bearer, and the indication information indicating the protocol type of the data packet borne by the associated bearer comprises indication information indicating that the associated bearer is used for bearing an F1 Application Protocol (F1AP) message; and
    sending, by the IAB node, the data packet to a child IAB node, a parent IAB node or an IAB donor through the bearer.

2. The method as claimed in claim 1, wherein the bearer configuration information further comprises at least one of the following:
    a bearer identifier containing a Data Radio Bearer Identifier (DRB ID) or a Signaling Radio Bearer Identifier (SRB ID);
    indication information indicating whether an adaptation layer needs to be parsed;
    indication information indicating F1AP encapsulation;
    indication information indicating General Packet Radio Service Tunneling Protocol User Plane (GTP-U) encapsulation;
    indication information indicating Packet Data Convergence Protocol (PDCP) processing;
    indication information indicating whether a data packet borne by an associated bearer is a forwarded data packet;
    indication information indicating that an associated bearer is used for forwarding.

3. The method as claimed in claim 1, wherein before acquiring, by the IAB node, the bearer configuration information, the method further comprises:
    sending, by the IAB node, indication information to a CU through a Radio Resource Control (RRC) message or an F1 message, wherein the indication information is IAB node indication information, or is used for requesting the bearer configuration information for the IAB node.

4. The method as claimed in claim 1, wherein acquiring, by the IAB node, the bearer configuration information from the CU comprises:
    acquiring, by the IAB node, the bearer configuration information from the CU through a Radio Resource Control (RRC) message; or,
    acquiring, by the IAB node, the bearer configuration information from the CU through an F1 message.

5. The method as claimed in claim 3, wherein the RRC message or the F1 message comprises identifier information of the IAB node.

6. A method for receiving a data packet, comprising:
    receiving, by an integrated Access and Backhaul Links (IAB) node, a data packet sent by a designated IAB node, wherein the designated IAB node is a child IAB node or a parent IAB node or an IAB donor, and processing, by the IAB node, the data packet according to bearer configuration information acquired from a Centralized Unit (CU), wherein the bearer configuration information comprises indication information indicating a protocol type of the data packet borne by an associated bearer, and the indication information indicating the protocol type of the data packet borne by the associated bearer comprises indication information indicating that the associated bearer is used for bearing an F1 Application Protocol (F1AP) message.

7. The method as claimed in claim 6, wherein processing the data packet according to the acquired bearer configuration information comprises:
 judging, by the IAB node according to the bearer configuration information, whether to perform adaptation layer parsing on the data packet; or,
 judging, by the IAB node according to the bearer configuration information, whether to perform F1 Application Protocol (F1AP) protocol layer processing on the data packet; or,
 judging, by the IAB node according to the bearer configuration information, whether to perform General Packet Radio Service Tunneling Protocol User Plane (GTP-U) protocol layer processing on the data packet; or,
 judging, by the IAB node according to the bearer configuration information, whether to perform Packet Data Convergence Protocol (PDCP) protocol layer processing on the data packet.

8. A device for sending a data packet, located in an Integrated Access and Backhaul Links (IAB) node, and comprising a memory and a processor, wherein the memory stores a computer program, and the processor is configured to run the computer program to execute the method as claimed in claim 1.

9. A device for receiving a data packet, located in an Integrated Access and Backhaul Links (IAB) node, and comprising a memory and a processor, wherein the memory stores a computer program, and the processor is configured to run the computer program to execute the method as claimed in claim 6.

* * * * *